US012447412B2

(12) United States Patent
Lin

(10) Patent No.: US 12,447,412 B2
(45) Date of Patent: Oct. 21, 2025

(54) COMMENTARY VIDEO GENERATION METHOD AND APPARATUS, SERVER, AND STORAGE MEDIUM

(71) Applicant: Tencent Technology (Shenzhen) Company Limited, Guangdong (CN)

(72) Inventor: Shaobin Lin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 550 days.

(21) Appl. No.: 17/944,589

(22) Filed: Sep. 14, 2022

(65) Prior Publication Data

US 2023/0018621 A1 Jan. 19, 2023

Related U.S. Application Data

(63) Continuation of application No. PCT/CN2021/130893, filed on Nov. 16, 2021.

(30) Foreign Application Priority Data

Dec. 25, 2020 (CN) ........................ 202011560174.5

(51) Int. Cl.
*A63F 13/86* (2014.01)
*A63F 13/537* (2014.01)
(Continued)

(52) U.S. Cl.
CPC ............ *A63F 13/85* (2014.09); *A63F 13/537* (2014.09); *A63F 13/58* (2014.09); *A63F 13/86* (2014.09); *H04N 21/44008* (2013.01)

(58) Field of Classification Search
CPC ........ A63F 13/537; A63F 13/58; A63F 13/85; A63F 13/86; H04N 21/44008
See application file for complete search history.

(56) References Cited

U.S. PATENT DOCUMENTS

| | | | | |
|---|---|---|---|---|
| 2003/0069052 A1 | 4/2003 | Higashiyama et al. | | |
| 2006/0058103 A1* | 3/2006 | Danieli | A63F 13/87 | 463/42 |
| 2007/0117617 A1* | 5/2007 | Spanton | A63F 13/12 | 463/40 |

FOREIGN PATENT DOCUMENTS

| | | |
|---|---|---|
| CN | 101018237 A | 8/2007 |
| CN | 110971964 A | 4/2020 |

(Continued)

OTHER PUBLICATIONS

International Search Report for PCT/CN2021/130893 dated Feb. 9, 2022.
Written Opinion for PCT/CN2021/130893 dated Feb. 9, 2022.

*Primary Examiner* — Jasson H Yoo
(74) *Attorney, Agent, or Firm* — Sughrue Mion, PLLC

(57) ABSTRACT

A commentary video generation method and apparatus, server, and storage medium. The method includes: obtaining a game instruction frame, the game instruction frame including at least one game operation instruction, and the game operation instruction being used for controlling a virtual object; generating a commentary data stream based on the game instruction frame, the commentary data stream including at least one piece of commentary audio describing a game event, and the game event being triggered during the virtual object performing the in-game behavior; rendering a game screen based on the game instruction frame to generate a game video stream, the game video stream including at least one game video frame; and combining the commentary data stream with the game video stream, the game video frame and the commentary audio corresponding to the same game event in the commentary video stream being aligned in time.

20 Claims, 6 Drawing Sheets

(51) Int. Cl.
*A63F 13/58* (2014.01)
*A63F 13/85* (2014.01)
*H04N 21/44* (2011.01)

(56) References Cited

FOREIGN PATENT DOCUMENTS

| | | | |
|---|---|---|---|
| CN | 111290724 | A | 6/2020 |
| CN | 111953910 | A | 11/2020 |
| CN | 112000812 | A | 11/2020 |
| JP | 2010-142346 | A | 7/2010 |

* cited by examiner

COMMENTARY VIDEO GENERATION METHOD AND APPARATUS, SERVER, AND STORAGE MEDIUM

CROSS-REFERENCE TO RELATED APPLICATION(S)

This application is a continuation application of International Application No. PCT/CN2021/130893, filed on Nov. 16, 2021, which claims priority to Chinese Patent Application No. 202011560174.5, filed with the China National Intellectual Property Administration on Dec. 25, 2020, the disclosures of which are incorporated by reference in their entireties.

FIELD

Embodiments of this disclosure relate to the field of artificial intelligence, and in particular, to a commentary video generation method and apparatus, a server, and storage medium.

BACKGROUND

With the rapid development of livestreaming technologies, live video streaming has become a daily live entertainment and communication manner, and currently, live game streaming has become one of the popular live video streaming.

Currently, during the live game streaming, a game streamer needs to commentate on the game based on how the game goes on. For a generation process of a game commentary video, processes such as game segment selection, commentary text writing, video editing, speech generation, and video synthesis need to be manually performed in advance to generate the commentary video for commentary playback.

However, the game commentary process in the related art requires manual participation in the process of producing a commentary video, and has a long production process and high manual operation costs.

SUMMARY

Embodiments of the disclosure may provide a commentary video generation method and apparatus, a server, and a storage medium, so that operation costs of commentary video generation can be reduced. The technical solutions are as follows:

A commentary video generation method may be provided, the method being performed by a commentary server, and including: obtaining a game instruction frame, the game instruction frame including at least one game operation instruction, and the game operation instruction being used for controlling a virtual object to perform an in-game behavior in a game; generating a commentary data stream based on the game instruction frame, the commentary data stream including at least one piece of commentary audio describing a game event, and the game event being triggered during the virtual object performing the in-game behavior; rendering a game screen based on the game instruction frame to generate a game video stream, the game video stream including at least one game video frame; and combining the commentary data stream with the game video stream to generate a commentary video stream, the game video frame and the commentary audio corresponding to the same game event in the commentary video stream being aligned in time.

A commentary video generation apparatus may be provided, including: an obtaining module, configured to obtain a game instruction frame, the game instruction frame including at least one game operation instruction, and the game operation instruction being used for controlling a virtual object to perform an in-game behavior in a game; a first generation module, configured to generate a commentary data stream based on the game instruction frame, the commentary data stream including at least one piece of commentary audio describing a game event, and the game event being triggered during the virtual object performing the in-game behavior; a second generation module, configured to render a game screen based on the game instruction frame to generate a game video stream, the game video stream including at least one game video frame; and a third generation module, configured to combine the commentary data stream with the game video stream to generate a commentary video stream, the game video frame and the commentary audio corresponding to the same game event in the commentary video stream being aligned in time.

A terminal may be provided, including a memory and one or more processors, the memory storing computer-readable instructions, the computer-readable instructions, when executed by the processor, causing the one or more processors to perform the following operations: obtaining a game instruction frame, the game instruction frame including at least one game operation instruction, and the game operation instruction being used for controlling a virtual object to perform an in-game behavior in a game; generating a commentary data stream based on the game instruction frame, the commentary data stream including at least one piece of commentary audio describing a game event, and the game event being triggered during the virtual object performing the in-game behavior; rendering a game screen based on the game instruction frame to generate a game video stream, the game video stream including at least one game video frame; and combining the commentary data stream with the game video stream to generate a commentary video stream, the game video frame and the commentary audio corresponding to the same game event in the commentary video stream being aligned in time.

One or more non-transitory computer-readable storage media storing computer-readable instructions may be provided, the computer-readable instructions, when executed by one or more processors, causing the one or more processors to perform the following operations: obtaining a game instruction frame, the game instruction frame including at least one game operation instruction, and the game operation instruction being used for controlling a virtual object to perform an in-game behavior in a game; generating a commentary data stream based on the game instruction frame, the commentary data stream including at least one piece of commentary audio describing a game event, and the game event being triggered during the virtual object performing the in-game behavior; rendering a game screen based on the game instruction frame to generate a game video stream, the game video stream including at least one game video frame; and combining the commentary data stream with the game video stream to generate a commentary video stream, the game video frames and the commentary audio corresponding to the same game event in the commentary video stream being aligned in time.

A computer program product or a computer program may be provided, the computer program product or the computer program including computer instructions, and the computer instructions being stored in a computer-readable storage medium. A processor of a computer device reads the computer instructions from the computer-readable storage medium, and executes the computer instructions, so that the computer device performs the commentary video generation method provided in the foregoing possible implementations.

BRIEF DESCRIPTION OF THE DRAWINGS

To describe the technical solutions of example embodiments of this disclosure more clearly, the following briefly introduces the accompanying drawings for describing the example embodiments. The accompanying drawings in the following description show only some embodiments of the disclosure, and a person of ordinary skill in the art may still derive other drawings from these accompanying drawings without creative efforts. In addition, one of ordinary skill would understand that aspects of example embodiments may be combined together or implemented alone.

DESCRIPTION OF EMBODIMENTS

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

The commentary video generation method provided in the embodiments of the disclosure mainly relates to the following technologies in the foregoing AI software technologies: a computer vision technology, a speech processing technology, and a natural language processing technology.

Figure 1:
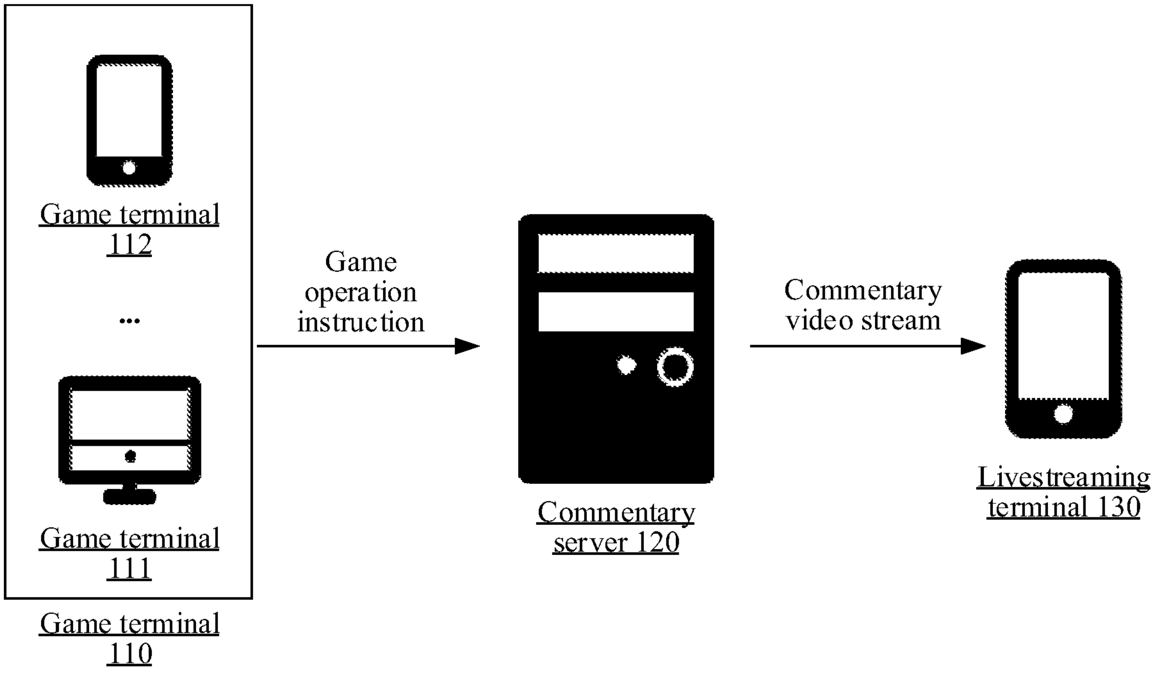
FIG. 1 is an architectural diagram of a commentary system according to some embodiments.

FIG. 1 is an architectural diagram of a commentary system according to some embodiments. The commentary system includes at least one game terminal 110, a commentary server 120, and a livestreaming terminal 130. The commentary system in this example embodiment is applied to a virtual online commentary scenario.

The game terminal 110 is a device installed with a game application. The game application may be a sports game, a military simulation program, a multiplayer online battle arena (MOBA) game, a battle royale shooting game, a simulation game (SLG), etc. The types of the game application are not limited in the embodiments. The game terminal 110 may be a smartphone, a tablet computer, a personal computer, etc. In some embodiments, in the virtual online game commentary scenario, when the game terminal 110 is running the game application, a user can control a virtual object in a game to perform an in-game behavior through the game terminal 110. Correspondingly, the game terminal 110 receives a game operation instruction for the user to control the virtual object and sends the game operation instruction to the commentary server 120, so that the commentary server 120 can render the game in the commentary server 120 based on the received game operation instruction.

The game terminal 110 is directly or indirectly connected to the commentary server 120 through wired or wireless communication.

The commentary server 120 is a back-end server or service server of the game application, and is configured to perform online game commentary and push a commentary video stream to other livestreaming platforms or terminals. The commentary server 120 may be an independent physical server, a server cluster including a plurality of physical servers, or a distributed system, or may be a cloud server providing basic cloud computing services such as a cloud service, a cloud database, cloud computing, a function, cloud storage, a network service, cloud communication, a middleware service, a domain name service, a security service, a content delivery network (CDN), big data, and an artificial intelligence platform. In some embodiments, the commentary server 120 may be configured to receive a game operation instruction (or game instruction frame) sent by a plurality of game terminals 110. For example, the commentary server 120 may receive game operation instructions sent by a game terminal 112 and a game terminal 111. On one hand, the commentary server 120 generates a commentary data stream based on analysis on the game instruction frame. On the other hand, the commentary server 120 renders the game online based on the game instruction frame to generate a game video stream in real time, and combines the commentary data stream with the game video stream to generate a commentary video stream to be pushed to the livestreaming terminal 130.

Based on the design of the server architecture, the commentary server 120 may include a game video stream generation server (configured to render a game screen based on the game instruction frame, and record to generate the game video stream), a commentary data stream generation server (configured to generate the commentary data stream based on the game instruction frame), and a commentary video stream generation server (configured to generate the commentary video stream based on the game video stream and the commentary data stream).

The livestreaming terminal 130 is directly or indirectly connected to the commentary server 120 through wired or wireless communication.

The livestreaming terminal 130 may be a device where a livestreaming client or video client is run, or a back-end server corresponding to the livestreaming client or video client. In some embodiments, if the livestreaming terminal 130 is a device where a livestreaming client or video client is run, the livestreaming terminal 130 can receive and decode the commentary video stream sent by the commentary server 120, and then play the commentary video on the livestreaming client or video client. Optionally, if the livestreaming terminal 130 is a back-end server corresponding to the livestreaming client or video client, the livestreaming terminal 130 can receive the commentary video stream sent by the commentary server 120 and push the commentary video stream to the corresponding livestreaming client or video client.

Figure 2:
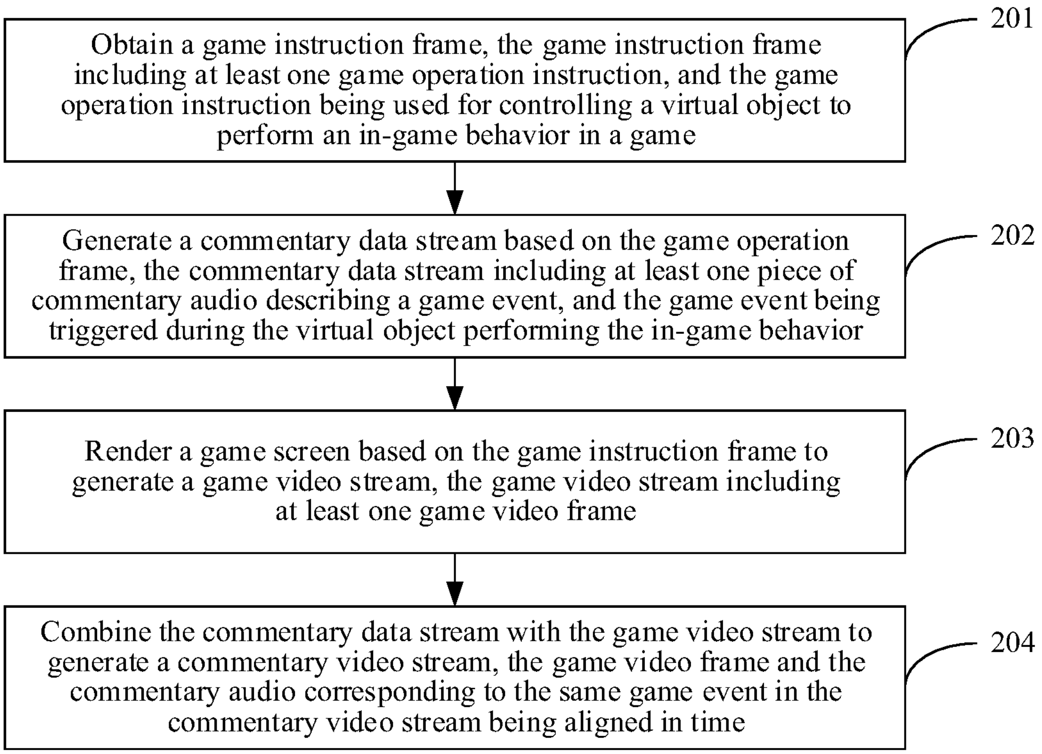
FIG. 2 is a flowchart of a commentary video generation method according to some embodiments.

FIG. 2 is a flowchart of a commentary video generation method according to some embodiments. The method being applied to the commentary server shown in FIG. 1 is used as an example for description. The method includes:

Operation 201. Obtain a game instruction frame. the game instruction frame including at least one game operation instruction, and the game operation instruction being used for controlling a virtual object to perform an in-game behavior in a game.

In the related art, after the game is over, a commentary text is written based on the game video, and the commentary text is converted into a speech, the speech being played to generate the commentary video. Different from this, an application scenario in some embodiments is an online game commentary scenario. That is, the commentary server automatically generates a corresponding commentary video stream during the game, and pushes the commentary video stream to a livestreaming terminal for playing, to improve the generation timeliness of the commentary video. To generate the commentary video during the game in real time, in a possible implementation, online game video rendering and online analysis and commentary can be implemented through analysis on the game instruction frame.

The game instruction frame includes at least one game operation instruction, and the game operation instruction is used for controlling the virtual object to perform the in-game behavior in the game. The in-game behavior refers to a behavior that the virtual object performs under the control of the user after the game begins. For example, the user controls the virtual object to move in a virtual environment, to cast a skill, to perform a preset game action, etc.

The terminal can control the virtual object to perform the in-game behavior in the game based on the game operation instruction. For example, when the user opens a game application and touches a skill cast control in the game application by the terminal, the terminal can generate the game operation instruction based on the touch operation of the user, and control the virtual object to cast a skill based on the game operation instruction.

In an embodiment, the game operation instruction is defined in a form of frame. Each game instruction frame may include a plurality of game operation instructions for elements in the game such as a player character and non-player character (NPC).

Operation 202. Generate a commentary data stream based on the game operation frame, the commentary data stream including at least one piece of commentary audio describing a game event, and the game event being triggered during the virtual object performing the in-game behavior.

To realize online game commentary and generate the commentary video in real time, some embodiments provide an online game comprehension technology where the game event to be commentated on during the game is obtained based on an online game process that analyzes and comprehends the game instruction frame.

The game instruction frame is a set of game operation instructions. Therefore, in an example embodiment, the commentary server can analyze the game operation instructions in the game instruction frame, accurately calculate changes in attribute value of objects in the virtual environment after receiving each game instruction frame, to discover the game event to be commentated on, and generate the commentary text based on the game event and convert the commentary text into the commentary audio, to generate the commentary data stream through the analysis on the game instruction frame.

In an embodiment, apart from the commentary audio, the commentary data stream further includes the commentary text, so that the commentary text can be added to a corresponding commentary video frame in the commentary video stream during subsequent generation of the commentary video stream.

In an example embodiment, if the game operation instruction in the game instruction frame is "Shen xx casts a mixed bomb", the commentary server can calculate corresponding information such as location and health points of each element in the game under the game operation instruction. If it is determined based on the information such as location and health points that a virtual object in the game loses a lot of health points after triggering the mixed bomb, the game event can correspondingly be determined as "Shen xx casts a mixed bomb with high damage" by analyzing the game instruction frame, to further generate the Commentary audio describing the game event.

Operation 203. Render a game screen based on the game instruction frame to generate a game video stream, the game video stream including at least one game video frame.

Based on the principle of online generation of the commentary video, when the user controls virtual objects to play games in different game clients, correspondingly, the game screen needs to be rendered in real time if the commentary video corresponding to the game process needs to be generated online. Therefore, there is no need to wait for the game to be over to obtain and process the game video to generate the commentary video, thereby further improving the real-time performance and timeliness of the commentary video generation.

When the user plays the game in the game client installed in the terminal (the mobile client), it is the game client that renders in real time the attribute changing process of each object or element in the game based on the received game operation instruction and the game operation instruction forwarded by the server (the back-end server or service server corresponding to the game client) from other users. Based on the game rendering process, in a possible implementation, the game client can also be installed in the commentary server to receive game operation instructions of game clients controlled by other users and render the game screen in real time according to the game operation instructions. Since the commentary video needs to be finally generated, the rendered game screen needs to be recorded to generate the game video stream including the game video frame.

Operations 202 and 203 may be performed simultaneously, or either operation 202 or operation 203 is performed first. The sequence of operations 202 and 203 is not limited herein.

Operation 204. Combine the commentary data stream with the game video stream to generate a commentary video stream, the game video frame and the commentary audio corresponding to the same game event in the commentary video stream being aligned in time.

During the online commentary video generation process provided in this embodiment, the commentary server generates two data streams respectively: the commentary data stream and the game video stream. There is a difference between processing processes of the two data streams. For example, the commentary data stream is generated at a lower rate due to the need of analysis on the game instruction frame. In addition, the game video stream is started, rendered, and recorded when the player loads the game while the commentary data stream is processed after the game begins. Therefore, due to the different processing rates of the two data streams, during the commentary video generation process, there is a need to align the two data streams and synchronize them with the commentary video by a criterion, so as to adapt to the different processing rates of the two data streams. In other words, the commentary server aligns the game video frame and the commentary audio corresponding to the same game event in time during the commentary video generation process. That is, the commentary audio corresponding to the game event needs to be played at the same time when the game video frame corresponding to the game event is displayed.

In summary, in some embodiments, through online analysis on the game instruction frame, the commentary audio is generated, the game video is rendered, the commentary audio and the game video are aligned in time to generate the commentary video. By analyzing the game instruction frame to generate the commentary video, on one hand, the commentary video matching the game is generated during the game. There is no need to wait for the game to be over to generate the commentary video, thereby improving the generation timeliness of the commentary video. Generating the commentary video matching the game during the game can avoid the case where the game video needs to be recorded and stored before the commentary video is generated, thereby saving electricity and storage resources consumed in recording and storage. On the other hand, instead of manually writing the commentary text to generate the commentary video, the commentary video can be generated automatically, thereby further improving the generation efficiency of the commentary video, and the matching degree of the commentary video with the game. Moreover, modifications for a mismatch are reduced effectively to save electricity and computing resources consumed by modifying the commentary video.

There is a time difference between the commentary data stream and the game video stream due to the different data processing rates of the game video stream and the commentary data stream. If the game video stream and the commentary data stream are aligned only at the beginning during the commentary video stream generation process, apparently there is no guarantee that the game event described by the commentary audio being played is displayed on the game video frame that is being displayed. Therefore, in a possible implementation, during aligning the game video stream and the commentary data stream in time, the commentary server needs to analyze to obtain the correspondence between the game video stream and the commentary data stream, and align the game video stream and the commentary data stream corresponding to the same game event in time.

Figure 3:
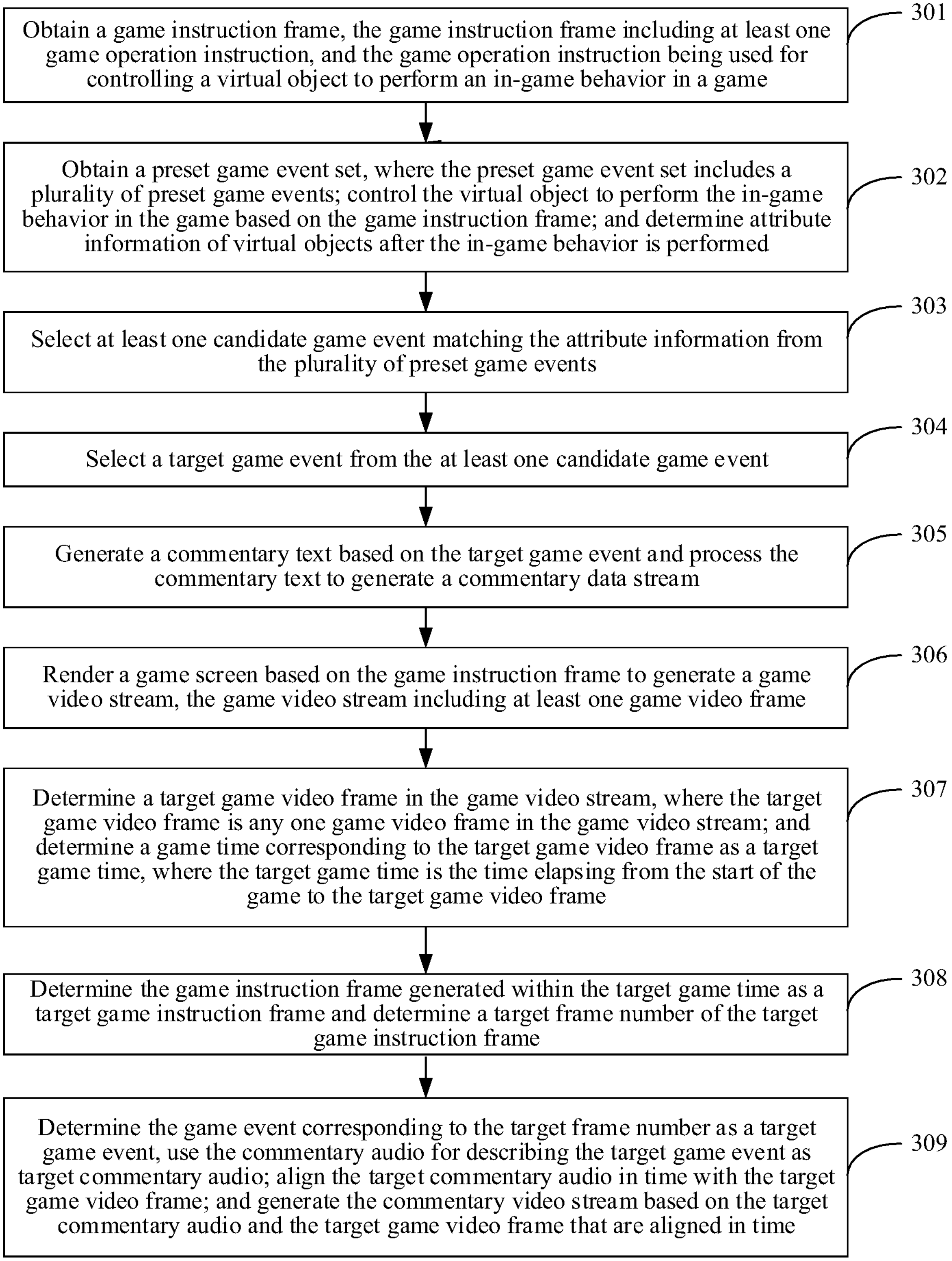
FIG. 3 is a flowchart of a commentary video generation method according to some embodiments.

FIG. 3 is a flowchart of a commentary video generation method according to some embodiments. The method being applied to the commentary server shown in FIG. 1 is used as an example for description. The method includes:

Operation 301. Obtain a game instruction frame, the game instruction frame including at least one game operation instruction, and the game operation instruction being used for controlling a virtual object to perform an in-game behavior in a game.

The game instruction frame corresponds to a first frame rate, that is, the game instruction frame is refreshed or obtained according to the first frame rate. In an exemplary example, if the first frame is 30 FPS, correspondingly, the game instruction frame is obtained every 33 ms, or there is an interval of 33 ms between adjacent game instruction frames. Correspondingly, each game instruction frame includes a game operation instruction generated within 33 ms.

In an example embodiment, the commentary server receives or obtains the game instruction frame according to the first frame rate, and analyzes a game based on the game instruction frame to obtain attribute information of each object in the game after an in-game behavior corresponding to the game instruction frame is performed.

Operation 302. Obtain a preset game event set, where the preset game event set includes a plurality of preset game events; control the virtual object to perform the in-game behavior in the game based on the game instruction frame; and determine attribute information of virtual objects after the in-game behavior is performed.

The attribute information may include the following information of the virtual objects in the game: location information, health point information, speed information, level information, skill information, feat information, equipment information, score information, etc. The specific information types of the attribute information are not limited thereto.

In an example embodiment, after receiving the game instruction frame, the commentary server controls the virtual object to perform the in-game behavior in the game based on the game operation instructions in the game instruction frame. Then the commentary server accurately calculates the attribute information of the objects in the virtual environment under each game operation instruction, so as to analyze and discover the game event that can be used for commentary based on the attribute information.

The objects in the game may include a virtual object controlled by a user (a player character), a virtual object controlled by a back-end device (a non-player character, NPC), or all kinds of virtual buildings, etc. The object types in the game are not limited thereto.

In an example embodiment, if the in-game behavior is "The home team hero has slain the visiting team red/blue BUFF", correspondingly, after this in-game behavior is performed, the obtained attribute information of the objects in the game includes "health points of the home team heroes, health points of the visiting team heroes, location of the visiting team heroes, equipment of the visiting team, etc.".

In an embodiment, the commentary server can preset the types of the attribute information (the attribute information types are dimensions of commentary features) to be analyzed in an online commentary process. Therefore, the attribute information needed is obtained based on the preset dimensions of the commentary features in the online commentary process.

In an example embodiment of multiplayer online battle arena (MOBA), the obtained attribute information can be summarized into four types: player character (the virtual object controlled by the user), NPC, team fight, and statistics. There is corresponding attribute information for each type. For example, corresponding attribute information for the team fight type may include: location of the team fight, virtual objects in the team fight (types or the number of the virtual objects), team fight type, team fight aim, team fight time, team fight result, etc.; corresponding attribute information for a single virtual object may include: health points, level, location, equipment, skill, feat, etc.; corresponding attribute information for NPC may include: health points, location, attacking skill, etc.; and corresponding attribute information for statistics may include: score, the number of towers, win rate, etc.

Operation 303. Select at least one candidate game event matching the attribute information from the plurality of preset game events.

To discover and comprehend the game event online, in an embodiment, the commentary server analyzes in advance the game events to be focused on in the commentary scenario and presets these game events in the commentary server to obtain a preset game event set. The commentary server sets corresponding preset attribute information (the preset attribute information is a preset condition that triggers the preset game event) for each preset game event in the preset game event set. Then, at least one candidate game event can be determined based on the preset attribute information and the obtained attribute information in the online commentary process.

Each preset game event in the preset game event set corresponds to the preset attribute information. Therefore, when determining at least one candidate game event matching the attribute information, the commentary server needs to determine whether the attribute information matches the preset attribute information of any preset game event in the preset game event set. In other words, the commentary server needs to match the attribute information with the preset attribute information of each preset game event. In this way, when it is determined that the attribute information matches the preset attribute information of a preset game event in the preset game event set, this preset game event corresponding to the matched preset attribute information can be determined as a candidate game event matching the attribute information. If the attribute information does not match the preset attribute information of any preset game event, correspondingly, the attribute information does not correspond to any preset game event.

By presetting the game event set, the candidate preset can be selected quickly from the preset game event set after the attribute information of the virtual object is obtained. Compared with generating the candidate game event in real time, some embodiments can enhance the efficiency of determining the candidate game event. Moreover, since the game event is generated in advance, electricity and computing resources consumed by generating the candidate game event in real time can be saved.

In an embodiment, the selecting at least one candidate game event matching the attribute information from a plurality of preset game events includes: matching the attribute information with the preset attribute information of the preset game events in the preset game event set to obtain target preset attribute information matching the attribute information; and determining the preset game event corresponding to the target preset attribute information as the candidate game event.

When the candidate game event needs to be determined, the commentary server can obtain the attribute information of the objects in the game after the in-game behavior is performed, and match the attribute information with the preset attribute information of the preset game events in the preset game event set. By doing this, the commentary server obtains the target preset attribute information matching the attribute information and determines the preset game event corresponding to the target preset attribute information.

In an embodiment, during determining the candidate game event, the attribute information of the virtual object is matched with the preset attribute information of the preset game event to obtain the candidate game event. The candidate game event selected can match a game event in the user's angle in the game. In this way, the probability of repeated commentary on the same game event is reduced, thereby reducing electricity and computing resources consumed by a repeated commentary video. Moreover, the accuracy of determining the final commentary event can be improved thereby reducing electricity and computing resources consumed by generating an inaccurate commentary video.

Correspondingly, the determining the preset game event corresponding to the target attribute information as the candidate game event includes: determining the preset game event corresponding to the target preset attribute information, and determining the preset game event that meets a preset commentary condition in the preset game events corresponding to the target preset attribute information as the candidate game event. The preset commentary condition includes at least one of a game angle condition or an event repeat condition. The game angle condition means that the preset condition game event is in a game viewing angle. In other words, after the attribute information matches the preset attribute information of any preset game event, the commentary server also needs to determine whether the preset game event corresponding to the target preset attribute information meets the preset commentary condition. For example, the commentary server needs to determine whether the preset game event corresponding to the target preset attribute information is within the game angle. If it is determined that the preset game event corresponding to the target preset attribute information is within the game angle, the preset game event is determined as the candidate game event corresponding to the game instruction frame. Otherwise, if the preset game event is not within the current game angle, the preset game event is eliminated from a plurality of candidate game events matched according to the attribute information.

The event repeat condition means that the number of times that the preset game event occurs within a preset duration is less than a threshold of times. In other words, after the attribute information matches the preset attribute information of a preset game event, it needs to further determine whether the preset game event has been repeatedly commentated within the preset time. If there is no repeated commentary, the preset game event is determined as the candidate game event matching the attribute information. Otherwise, the preset game event is eliminated from the candidate game events.

In an embodiment, the candidate game event can be set to meet any one of the game angle condition or the event repeat condition, or to meet both of the two conditions.

The preset commentary condition includes at least one of the game angle condition or the event repeat condition. What is determined as the candidate game event is the preset game event that meets the preset commentary condition in the preset game events corresponding to the target preset attribute information. In this way, the probability of the repeated commentary on the game event is reduced, and the probability of the commentary outside the game viewing angle can be reduced. Therefore, the electricity and computing resources consumed by generating the commentary video not within the game viewing angle are saved. Modifications for an unsuitable game viewing angle are reduced to save the electricity and computing resources consumed by modifying the commentary video.

Figure 4:
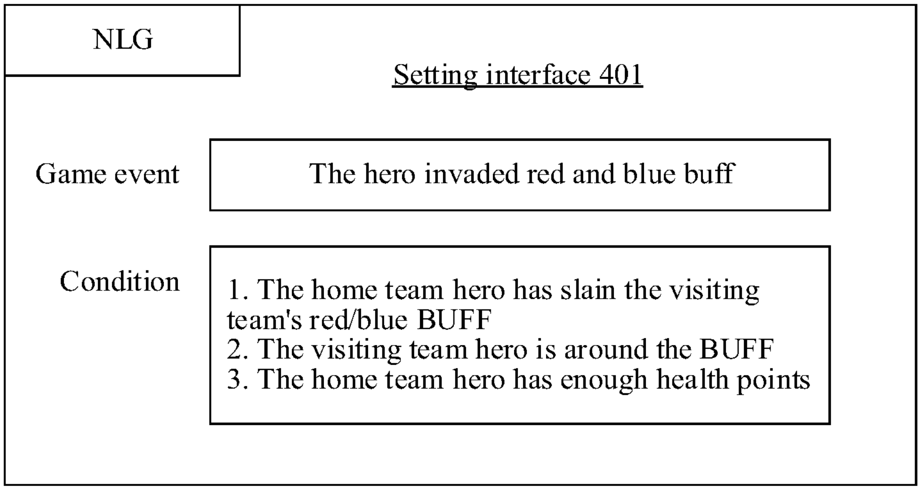
FIG. 4 is a diagram of a setting interface of preset attribute information corresponding to a preset game event.

FIG. 4 is a diagram of a setting interface of preset attribute information corresponding to a preset game event. In the setting interface 401, the preset game event is "The hero invaded the red blue BUFF", the corresponding preset attribute information (a trigger condition) can be "The home team hero has slain the visiting team's red/blue BUFF, the visiting team hero is around the BUFF, and the home team hero has enough health points.", etc.

Operation 304. Select the target game event from the at least one candidate game event.

There may be more than one candidate game event matching the attribute information, but only one game event can be commentated on in each commentary moment. Therefore, in an example embodiment, if the attribute information matches a plurality of candidate game events, the best game event needs to be selected from a plurality of candidate game events as the target game event to generate a subsequent commentary text and commentary audio.

In an embodiment, the selecting the target game event from the at least one candidate game event includes the following operations:

1. Obtain event weights corresponding to the candidate game events.

The event weights are offline event weights or basic event weights corresponding to the candidate game events. In other words, the event weights are not directly related to the current game.

In an example embodiment, the commentary server has a commentary event scoring model. The commentary event scoring model is formed by labeling the commentary event a professional commentary host has selected and offline iterate learning. Therefore, only by inputting the candidate game events generated by the game instruction frames into the trained commentary event scoring model, the event weights corresponding to the candidate game event can be obtained. The commentary game events and their corresponding event weights are stored in the commentary server, so that the event weights corresponding to the candidate game events can be found according to the determined candidate game events.

In an embodiment, since the commentary server has the commentary event scoring model, there is no need to store the candidate game events and their corresponding event weights. In the online commentary process, the commentary server inputs the candidate game events into the commentary event scoring model to obtain the event weights corresponding to the candidate game events.

In an example embodiment, if three candidate game events are generated based on the game instruction frame, the event weights corresponding to the three candidate game events respectively are: The event weight corresponding to candidate game event 1 is 0.6, the event weight corresponding to candidate game event 2 is 0.7, and the event weight corresponding to candidate game event 3 is 0.8.

2. Determine event scores corresponding to the candidate game events based on the importance of the candidate game events in the game.

The event weight obtained in operation 1 is the offline event weight without direct relation to the current game. If the target game event is selected only based on the offline event weight, the target game event selected may not be the most wonderful or the user's more expected game event to be commentated on. Therefore, in a possible implementation, based on the event weights, the commentary server also needs to consider the importance of the candidate game events in the game to determine the event scores corresponding to the candidate game events.

The importance of the candidate game events is related to at least one of the following: a location where the candidate game event occurs, the virtual object type that triggers the candidate game event, and the number of the virtual objects that trigger the game event. In other words, if the game event occurs within the current game angle, correspondingly, the event score of the game event is set high, otherwise the event score of the game event is set low; if the number of the virtual objects that trigger the game event is large, the event score of the game event is set high, otherwise the event score of the game event is set low; and if the virtual object that triggers the game event is a main role (or an important role) in the game, the event score of the game event is set high, otherwise the event score of the game event is set low, where the main role and important role are preset by a developer.

In an embodiment, multiplayer online battle arena (MOBA) is used as an example. When determining the event score, the commentary server can, through scoring the team fight and scoring the event within the team fight, synthesize to obtain the event scores corresponding to the candidate game events. The team fight scoring is related to the number of roles in the team fight (the more the roles are in the team fight, the higher the score is set), team fight location (the more important the resources occupied by the team fight are, the higher the score is set), team fight result (the score is set higher if the team fight is won), etc.; and scoring the event within a team fight is related to the type of heroes participating in the game event (the more important the heroes are, the higher the event score is set), the score of the heroes participating in the game event (the higher score the heroes obtain, the higher the event score is set), etc.

Elements that affect the event scores corresponding to the candidate game events are preset by the developer.

3. Weight the event scores by the event weights to obtain event weighted scores corresponding to the candidate game events.

In an example embodiment, basic weights of the event and online scoring are considered to obtain the event weighted scores corresponding to the candidate game events, so that the target game event is selected from a plurality of candidate game events based on the event weighted scores. That is, the commentary server can consider the event weights and the event score of the candidate game event to obtain the event weighted score of the candidate game event.

In an example embodiment, if the game instruction frame corresponds to three candidate game events, the event weight corresponding to candidate game event 1 is 0.6, and the event score is 50; the event weight corresponding to candidate game event 2 is 0.7, and the event score is 50; and the event weight corresponding to candidate game event 3 is 0.6, and the event score is 80. The event weighted scores of the candidate game events respectively are: The event weighted score corresponding to candidate game event 1 is 30; the event weighted score corresponding to candidate game event 2 is 35; and the event weighted score corresponding to candidate game event 3 is 42.

During setting the event score, the scoring can be done according to the ten-point system or the hundred-point system. This is not limited herein.

4. Determine the candidate game event with the highest event weighted score as the target game event.

Only one game event can be commentated on in one commentary moment. A higher event weighted score means that the game event in an offline commentary scenario attracts more attention, and meanwhile is of greater importance in the current game situation. Therefore, during determining the target game event from a plurality of candidate game events, the candidate game event with the highest event weighted score is determined as the target game event.

In an example embodiment, if the event weighted scores of the candidate game events respectively are: The event weighted score corresponding to candidate game event 1 is 30, the event weighted score corresponding to candidate game event 2 is 35, and the event weighted score corresponding to candidate game event 3 is 42, the corresponding target game event is candidate game event 3.

In some embodiments, multiplayer online battle arena (MOBA) (including a team fight situation) is taken as an example. When selecting the target game event from a plurality of candidate game events, the commentary server can first select the game event based on the number of the virtual objects in the team fight. For example, if the game includes two team fights, where the team fight A has 3 virtual objects and the team fight B has 7 virtual objects, priority is given to the game event corresponding to the team fight B in selecting the game event. Selecting elements may include the types and scores of the virtual objects. For example, the team fight B corresponds to 3 candidate game events, and the 3 virtual game events are respectively performed by a virtual object A and a virtual object B. The virtual object A is an important hero role. Correspondingly, the candidate game event corresponding to the virtual object A is determined as the target game event.

In some embodiments, the target game event is determined based on a single game instruction frame. Optionally, during determining the game event, the target game event cannot be determined only based on the single game instruction frame. At least two game instruction frames may be needed to determine the target game event.

A higher event weighted score means that the game event in offline commentary attracts more attention, and meanwhile is of greater importance in the current game situation. Therefore, the candidate game event with the highest event weighted score is determined as the target game event, so that the game event to be commentated finally will be more important. In this way, the user can have better experience, and the commentary on the game event can also produce better effects. In addition, generating the important commentary video for important game event can also reduce the probability of generating the unimportant commentary video for the unimportant game event. Therefore, electricity and computing resources consumed by generating the unimportant commentary video can be saved.

Operation 305. Generate the commentary text based on the target game event, and process the text to generate a commentary data stream.

In a possible implementation, after the corresponding target game event is obtained based on analysis on the game instruction frame, the commentary server needs to automatically generate the commentary text through a natural language understanding (NLU) technology, and convert the commentary text into a commentary speech through a TTS technology, to obtain the commentary data stream so as to realize online game comprehension.

The commentary audio describes the target game event and the target game event corresponds to the single target game instruction frame or a plurality of target game instruction frames. Therefore, in a possible implementation, the commentary audio is associated with its corresponding target game event or a frame number of its corresponding game instruction frame. In this way, the corresponding commentary audio can be found according to the frame number during generating the commentary video later.

Operation 306. Render a game screen based on the game instruction frame to generate a game video stream, the game video stream including at least one game video frame.

For the implementation of operation 306, reference may be made to the foregoing embodiment, and details are not described again in this embodiment.

Operation 307. Determine a target game video frame in the game video stream, where the target game video frame is any one game video frame in the game video stream; and determine a game time corresponding to the target game video frame as a target game time, where the target game time is the time elapsing from the start of the game to the target game video frame.

The reasons for different data processing rates of the commentary data stream and the game video stream includes: On one hand, the game video stream starts to be rendered and recorded when the user loads the game while the commentary data stream is processed after the player enters the game. The recording time of the game video stream is obviously longer than the game time. Therefore, there is a time difference between the commentary data stream and the game video stream. On the other hand, the difference between a frame rate of the game instruction frame and a record frame of the game video frame also causes the time difference between the game video stream and the commentary data stream. Therefore, there is a need to analyze the correspondence between the commentary data stream and the game video stream, so that the game video frame and the commentary audio corresponding to the same game event are aligned in time to generate a commentary video stream.

No matter how long the game video stream is prolonged, game time is still a main timeline of commentary. Therefore, in a possible implementation, the commentary server sets the timeline in the commentary video stream based on the game time in the game. In other words, the commentary server determines the commentary audio corresponding to the game time by obtaining the target game time in the game video frame, that is, the time elapsing from the game time to the target game video frame. The target game video frame is a video frame in the game video stream. Therefore, the target game time of the target game video frame is the time elapsing from the start of the game to the target game video frame.

Operation 308. Determine the game instruction frame generated within the target game time as the target game instruction frame, and determine a target frame number of the target game instruction frame.

A target commentary audio is generated based on the received target game instruction frame. Therefore, the target commentary audio describing the target game event can correspond to the frame number corresponding to the target game instruction frame. Therefore, in a possible implementation, the commentary server can generate the target frame number of the target game instruction frame based on the game time, and then determine the target commentary audio according to the target frame number.

In an embodiment, the process of determining the target frame number of the target game instruction frame may be: determining the target frame number of the target game instruction frame based on the target game time and the first frame rate.

The game instruction frame has a preset frame rate of obtaining or refreshing (the first frame). Correspondingly, during determining which frame of game instruction frame the target game time corresponds to the target frame number of the target game instruction frame needs to be calculated based on the target game time and the first frame rate.

In an example embodiment, if the target game instruction frame is generated in the target game time, the first frame rate is 30 FPS, that is, the interval between two adjacent game instruction frames is 30 ms. If the target game time is 13 minutes, 56 seconds and 34 milliseconds, the corresponding target frame number of the target game instruction frame is: the target game time of the target game video frame divided by the time interval of the adjacent game instruction frames. In other words, the target frame number corresponding to the target game time 13 minutes, 56 seconds and 34 milliseconds is frame 25334.

The target frame number of the target game instruction frame can be obtained by a simple calculation of the target game time and the first frame rate, which not only improves the efficiency of determining the target frame number, but also saves the electricity and storage resources consumed by the complex calculation.

Figure 5:
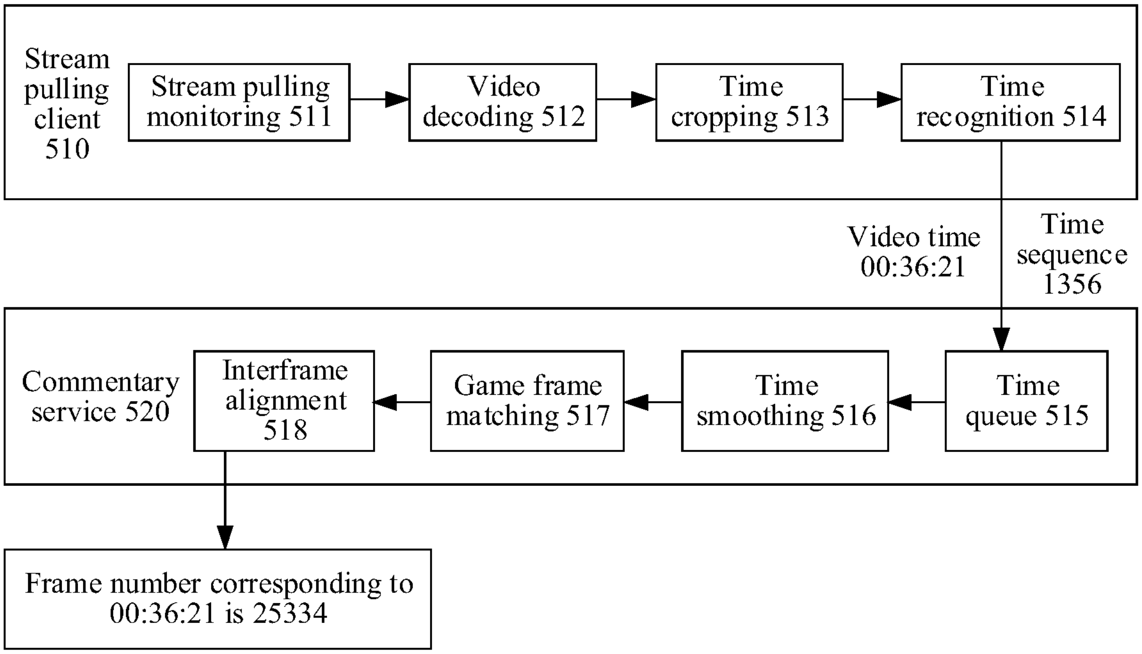
FIG. 5 is a schematic diagram of an alignment process of a game video frame and a game instruction frame according to some embodiments.

FIG. 5 is a schematic diagram of an alignment process of a game video frame and a game instruction frame according to some embodiments. The recognition process of the game time in the game video frame is in a stream pulling client 510, that is, the stream pulling client 510 pulls the game video stream from the server that generates the game video stream, and performs game time recognition on the game video frames in the game video stream. The game time recognition process includes stream pulling monitoring 511, video decoding 512, time cropping 513, and time recognition 514. The stream pulling monitoring 511 refers to monitoring the generation of the game video stream and pulling the game video stream in time. The video decoding 512 is used to decapsulate the pulled game video stream to obtain consecutive game video frames. The time cropping 513 is used to crop a local image including the game time in the game video frame to obtain the local image, and then perform the subsequent time recognition. In the time recognition 514, a time sequence included in the game video frame is recognized as 1356, that is, the video time of the game video frame in the game video stream, 36 minutes and 21 seconds, corresponds to the game time, 13 minutes and 56 seconds; the time sequences of the game video frames recognized by the stream pulling client 510 are formed into a time queue 511 which is sent to the commentary service 520. Interframe alignment is performed in the commentary service 520. Time smoothing 516 is used to process the obtained time queue in a case of erroneous time recognition, that is, there is a large difference between adjacent time sequences; and then game frame matching 517 is performed. The game frame matching 517 is used to generate the target frame number corresponding to the target game instruction frame based on the time sequence (the target game time). If the target frame number has a corresponding target game event, interframe alignment 518 is performed, that is, the video time of the game video frame in the game video stream, 36 minutes and 21 seconds, is aligned in time with commentary audio whose frame number is 25334.

Operation 309. Determine the game event corresponding to the target frame number as a target game event, and use the commentary audio for describing the target game event is used as target commentary audio; align the target commentary audio in time with the target game video frame; and generate the commentary video stream based on the target commentary audio and the target game video frame that are aligned in time.

Not each game video frame corresponds to the target game event. The target frame number corresponds to the target game instruction frame and the target game instruction frame corresponds to the target game event. Therefore, the commentary server can search for the corresponding target game event in the commentary data stream based on the target frame number. If the target game event corresponding to the target frame number is found, the target commentary audio for describing the target game event is aligned in time with the target game video frame, that is, the target commentary audio is played while the target game video frame is displayed. In an embodiment, the commentary data stream may further include a commentary text. When synthesizing the commentary video stream, the commentary server can embed a target commentary text corresponding to the target game video frame into the preset position of the target game video frame, and adjust the target commentary audio and the target game video frame to the same time.

In this embodiment, by analyzing the attribute information of the objects after the in-game behavior indicated by the game operation instruction, the corresponding candidate game event can be matched with the attribute information based on the attribute information and the preset attribute information of the preset game event. In this way, the game event is obtained by the automatic analysis without manual intervention, so that the commentary text and the commentary audio can be generated subsequently based on the game event, thereby improving the generation efficiency of the commentary video. In addition, the game time is used as a criterion to adjust the commentary data stream and the game video stream to realize online synthesis and generation of the commentary video. Therefore, the video image and the commentary audio of the same game event can be synchronized. The commentary on the game event can produce better effects based on the synchronized video image and commentary audio. Furthermore, the operation costs of online generation of the commentary video are reduced as there is no need to manually edit the game video. In addition, the game time can be used as a criterion in the game to adjust the commentary video and the game video stream, which can avoid the case where before the commentary video is generated, the game process video needs to be recorded and stored, and the commentary audio is generated and stored in advance, thereby saving electricity and storage resources consumed in recording and storage.

The accuracy of the game time in the game video frame is in seconds while the interval of image refreshing is in milliseconds. Therefore, in order to increase the accuracy of determining the target frame number, in an embodiment, the commentary server needs to correct the game time recognized in the target game video frame.

Figure 6:
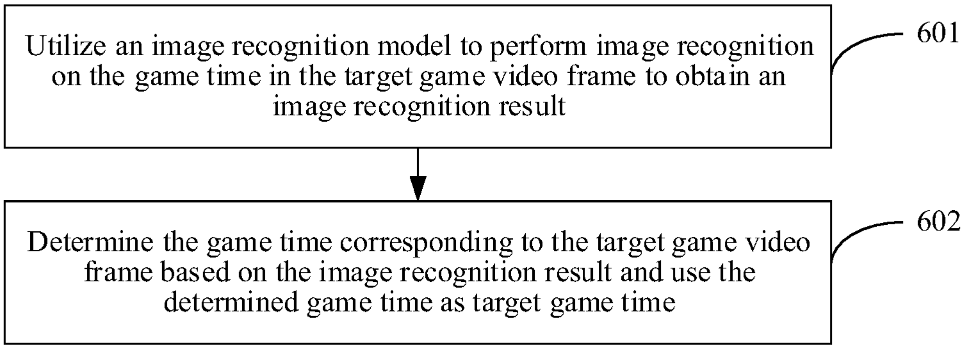
FIG. 6 is a flowchart of a method for determining a target game event according to some embodiments.

FIG. 6 is a flowchart of a method for determining a target game event according to some embodiments. The method being applied to the commentary server shown in FIG. 1 is used as an example for description. The method includes:

Operation 601. Utilize an image recognition model to perform image recognition on the game time in the target game video frame to obtain an image recognition result.

The game time is displayed in the game video frame. Therefore, in a possible implementation, the commentary server can perform the image recognition on the game time in the target game video frame to obtain a target game time corresponding to the target game video frame.

The commentary server has the image recognition model, and can input the target game video frame into the image recognition model for image recognition and output the game time included in the target game video frame. The image recognition model may be a (Deep Neural Networks, DNN) model for handwritten digit recognition in the CV field.

Figure 7:
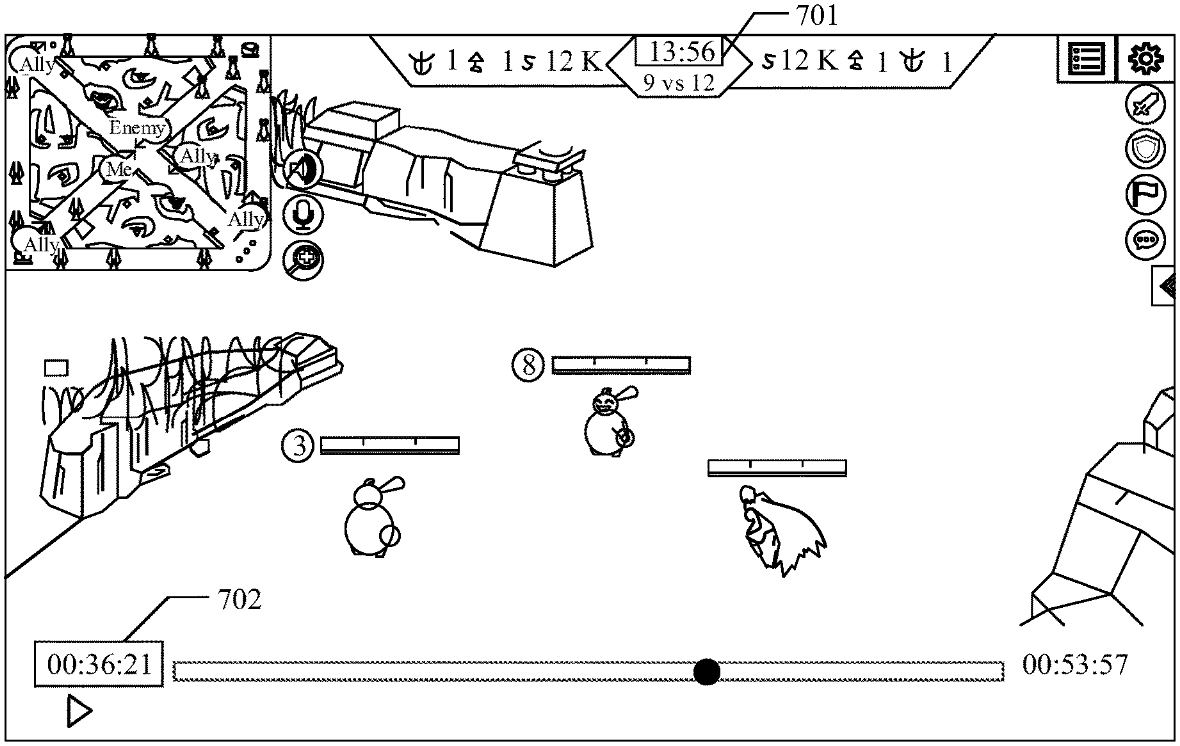
FIG. 7 is a schematic diagram of a game video frame according to some embodiments.

FIG. 7 is a schematic diagram of a game video frame according to some embodiments. A video time 702 corresponding to the game video frame is 36 minutes and 21 seconds, and a game time 701 corresponding to the game video frame is 13 minutes and 56 seconds.

When image recognition is performed on the game time in the target game video frame, the target game video frame can be directly inputted into the image recognition model to obtain the game time outputted by the image recognition model; or time cropping is performed on the target game video frame, that is, a local image including the game time is cropped from the target game video frame, and is inputted into the image recognition model to obtain the game time outputted by the image recognition model.

Operation 602. Determine the game time corresponding to the target game video frame based on the image recognition result and use the determined game time as the target game time.

In an example embodiment, the commentary server can directly determine the time obtained from the image recognition result as the target game time corresponding to the target game video frame.

The target game time included in the game video stream is in seconds. However, when the frame number is calculated based on the frame rate, the interframe alignment requires accuracy to the millisecond level. Therefore, in a possible implementation, the commentary server can introduce frequency counting to accumulate frequency of the game time obtained from the image recognition result so as to obtain the target game time in milliseconds.

Performing the image recognition on the target game time in the target game video frame by the image recognition model can increase the accuracy of the target game time recognized. Time alignment between the target commentary audio and the target game video frame is more accurate based on the target game time recognized accurately. In addition, the more accurate time alignment can effectively reduce the modifications needed due to misalignment or low accuracy of alignment and save electricity and computing resources consumed by modifying the commentary video.

In an example embodiment, operation 602 may include the following operations:

1. Determine a basic game time corresponding to the target game video frame based on the image recognition result.

In an example embodiment, time data obtained from the image recognition result is determined as the basic game time corresponding to the target game video frame, so that the basic game time is corrected subsequently based on the accumulated frequency and a second frame rate.

2. Determine a game time offset based on historical recognition times and the second frame rate.

The second frame rate is a frame rate corresponding to the game video stream. If the second frame rate is 60 FPS, the time interval between two adjacent game video frames is 17 ms.

The second frame rate can provide time in milliseconds. Therefore, in a possible implementation, the commentary server can calculate an offset of an actual game time based on the historical recognition times of the basic game time and the second frame rate. The historical recognition times of the basic game time refer to the number of times that the basic game time is recognized during a historical recognition period. The historical recognition period refers to a period before image recognition is performed on the target game video frame.

In an example embodiment, if the second frame rate is 60 FPS and the basic game time is 13 minutes and 56 seconds, the corresponding game time offset is 17 ms when the basic game time is recognized for the first time; and the corresponding game time offset is 34 ms when the basic game time is recognized for the second time.

3. Determine a sum of the basic game time and the game time offset as the target game time.

The game time offset is in milliseconds. Therefore, the sum of the game time offset and the basic game time can be determined as the target game time to obtain a target game time in the millisecond level.

In an example embodiment, if the basic game time is 13 minutes and 56 seconds, and the game time offset is 34 ms, the corresponding target game time can be 13 minutes 56 seconds and 34 milliseconds.

In an example embodiment, the correspondence between the target game video frame and the target game instruction frame can be shown in Table 1 and Table 2.

TABLE 1

| Video time | Basic game time | Image frequency | Time of each frame | FPS | Target game time |
|---|---|---|---|---|---|
| 36 minutes and 21 seconds | 13 minutes and 56 seconds | 2 | 17 ms | 60 | 13 minutes 56 seconds and 34 milliseconds |

TABLE 2

| Event name | Event frame | Game frame number | Time of each frame | FPS | Target game time |
|---|---|---|---|---|---|
| Cheng xx has been slain | 25334 | 25334 | 33 ms | 30 | 13 minutes 56 seconds and 34 milliseconds |

According to the correspondence in Table 1 and Table 2, the target game video frame with the video time of 36 minutes and 21 seconds corresponds to the target game time of 13 minutes 56 seconds and 34 milliseconds, the target frame number of the corresponding target game instruction frame is 25334, and the corresponding target game event is "Cheng xx has been slain".

In this embodiment, by analyzing the historical recognition times of the game time in the game video frame and in combination with the frame rate of the game video stream, the target game time in milliseconds can be correctly calculated, so as to align the target game video frame and the target commentary audio in time. Therefore, not only the accuracy of determining the target game time is increased, but also the accuracy of interframe alignment is increased. In addition, the more accurate time alignment can effectively reduce the modifications needed due to inaccuracy, thereby saving electricity and computing resources consumed by modifying the commentary video.

In some embodiments, in single-round games with a plurality of virtual objects such as multiplayer online game arena, there are a plurality of virtual objects in the game. Different game viewing angles may be included in the commentary video generation process. The different game viewing angles can be focusing on the angle of a virtual object. Therefore, during rendering the game screen and generating the game video stream, the game video stream needs to be generated from the different game viewing angles based on the different game viewing angles.

Figure 8:
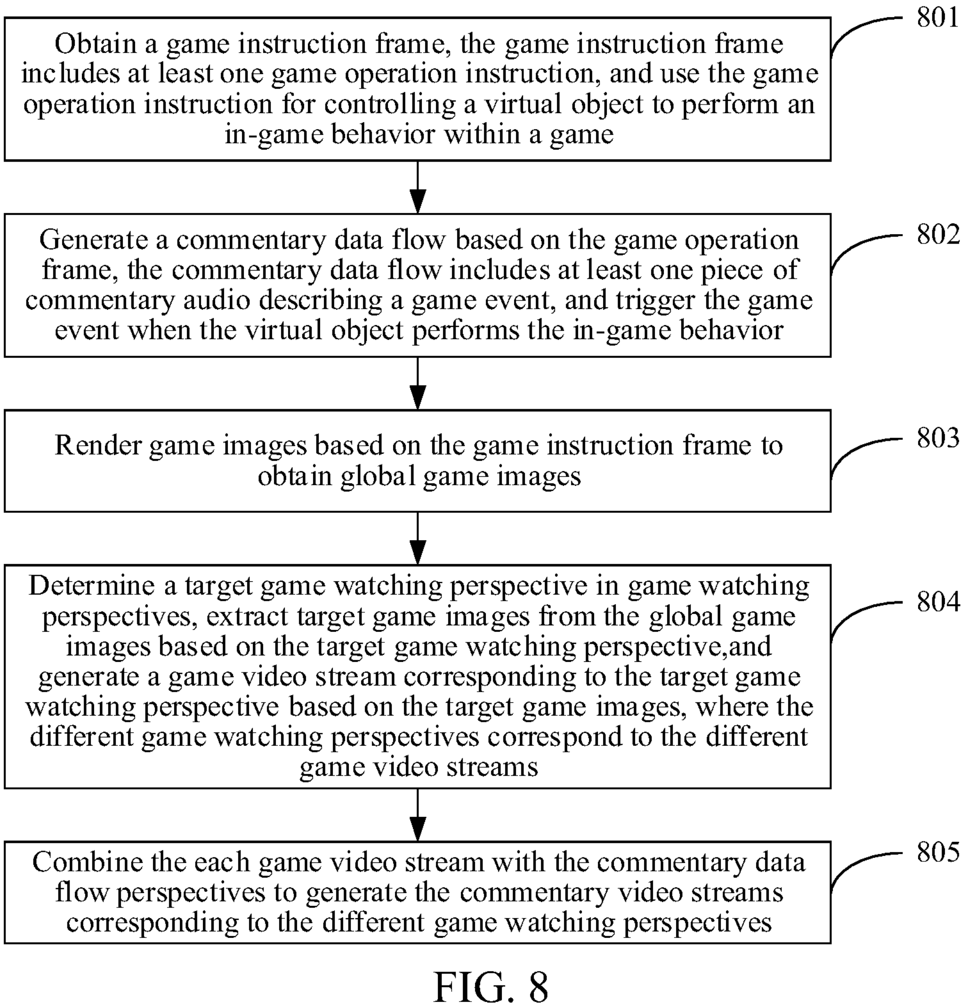
FIG. 8 is a flowchart of a commentary video generation method according to some embodiments.

FIG. 8 is a flowchart of a commentary video generation method according to some embodiments. The method being applied to the commentary server shown in FIG. 1 is used as an example for description. The method includes:

Operation 801. Obtain a game instruction frame, the game instruction frame including at least one game operation instruction, and the game operation instruction being used for controlling a virtual object to perform an in-game behavior in a game.

Operation 802. Generate a commentary data stream based on the game instruction frame, the commentary data stream including at least one piece of commentary audio describing a game event, and the game event being triggered during the virtual object performing the in-game behavior.

For implementations of operations 801 and 802, reference may be made to the foregoing embodiment, and details are not described again.

Operation 803. Render the game screen based on the game instruction frame to obtain a global game screen;

The game instruction frame can include game operation instructions sent by game clients corresponding to different virtual objects (controlled by users). Therefore, during rendering the game screen according to the game instruction frame, the global rendering is needed, and the global game screen is obtained after recording.

Operation 804. Determine a target game viewing angle in game viewing angles; and extract a target game screen from the global game screen based on the target game viewing angle, and generate a game video stream corresponding to the target game viewing angle based on the target game screen, where different game viewing angles correspond to different game video streams.

During commentary, game events occur in different places. For a clear or correct angle for the users to view an ongoing game event, in a possible implementation, the commentary server can obtain the game video streams from the different game viewing angles.

The different game viewing angles can be centered on different virtual objects, where the virtual objects are controlled by the users.

The manner for obtaining the game video streams corresponding to the different game viewing angles can be: extracting the game screens of the needed game viewing angles from the global game screen and recording different game screens to obtain the game video streams corresponding to the different game viewing angles; or distributing the different game viewing angles in different servers that have a sound card device for both rendering and recording to generate the game video streams corresponding to the different game viewing angles.

Operation 805. Combine game video streams with the commentary data stream to generate the commentary video streams corresponding to the different game viewing angles.

Based on generating the game video streams corresponding to the different game viewing angles, during generation of the commentary video stream, the different game video streams also need to be combined with the commentary data stream to generate the commentary video streams corresponding to the different game viewing angles.

In the scenario of generating the commentary video streams corresponding to the different game viewing angles, the commentary server can push the commentary video streams corresponding to the different game viewing angles to livestreaming platforms or clients, so that the livestreaming platforms or clients can switch the game viewing angles as needed; or according to the needs of different livestreaming platforms or clients, the commentary server pushes the target commentary data stream corresponding to the game viewing angle needed to the livestreaming platforms or clients.

In some embodiments, different commentary video streams can be generated based on the different game viewing angles. Therefore, different commentary video streams can be accurately pushed to different platforms according to their needs, thereby improving the accuracy of the pushed commentary video streams; or, during playing the commentary video streams, the game viewing angle can be switched, thereby improving the diversity of the commentary video streams. Pushing accurate commentary video streams to different platforms can reduce modifications needed due to inaccurate pushing, thereby saving electricity and computing resources consumed by modifying the pushed commentary video streams.

Figure 9:
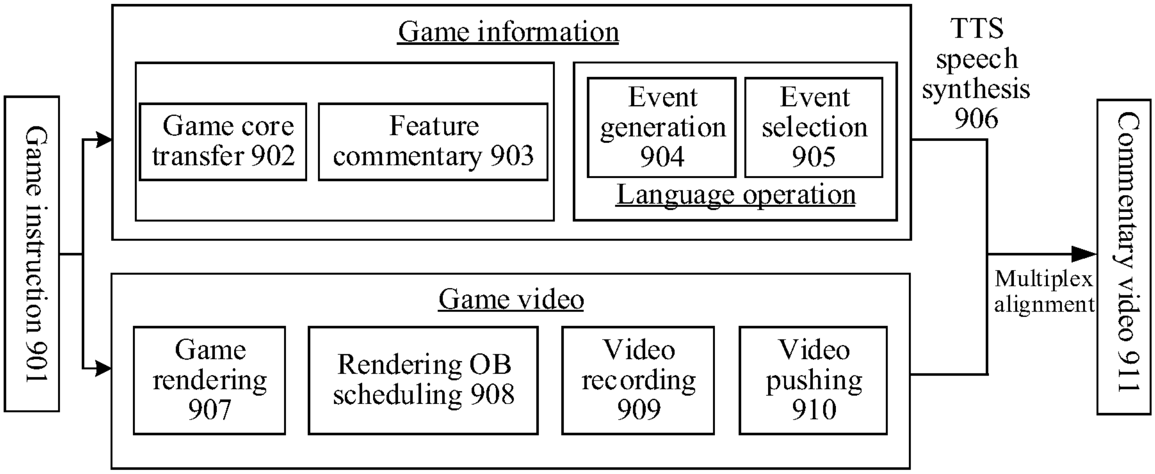
FIG. 9 is a schematic process diagram of complete generation of a commentary video stream according to some embodiments.

FIG. 9 is a schematic process diagram of complete generation of a commentary video stream according to some embodiments. A commentary server receives a game instruction 901 (a game operation instruction), where one generates a commentary data stream through game information obtaining and TTS speech synthesis, and one generates a game video stream based on the game instruction. The process of generating the commentary data stream includes: game core transfer 902 (that is, analyzing the game instruction frame), feature commentary 903 (that is, obtaining attribute information of objects in a game), event generation 904 (that is, determining at least one candidate game event matching the attribute information based on the attribute information), event selection 905 (that is, selecting a target game event from a plurality of candidate game events), and TTS speech synthesis 906 (that is, generating a commentary text based on the target game event and obtaining commentary audio by TTS processing). The process of generating the game video stream includes: game rendering 907 (that is, rendering the game based on the game instruction frame to generate a game screen), rendering outside broadcast (OB) scheduling 908 (that is, obtaining game screens corresponding to different game viewing angles by rendering), video recording 909 (recording the game screen to generate the game video stream), and video pushing 910 (pushing the game video stream to a server that generates the commentary video stream). After obtained, the game video stream and the commentary data stream can be aligned to generate a commentary video 911.

Figure 10:
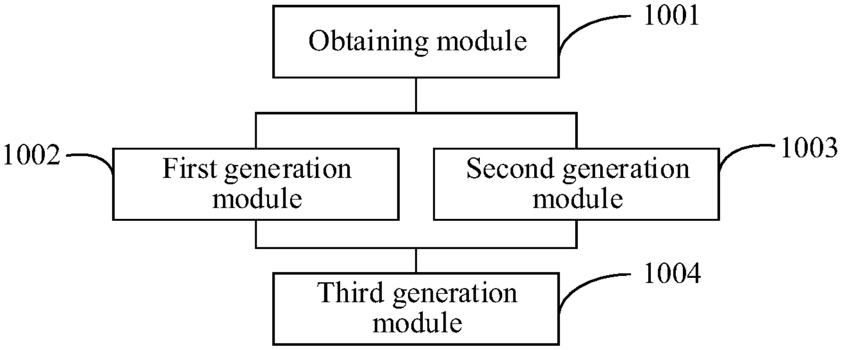
FIG. 10 is a structural block diagram of a commentary video generation apparatus according to some embodiments.

FIG. 10 is a structural block diagram of a commentary video generation apparatus according to some embodiments. The commentary video generation apparatus may be implemented as part or total of a server. The commentary video generation apparatus may include:

an obtaining module 1001, configured to obtain a game instruction frame, the game instruction frame including at least one game operation instruction, and the game operation instruction being used for controlling a virtual object to perform an in-game behavior in a game;

a first generation module 1002, configured to generate a commentary data stream based on the game instruction frame, the commentary data stream including at least one piece of commentary audio describing a game event, and the game event being triggered during the virtual object performing the in-game behavior;

a second generation module 1003, configured to render a game screen based on the game instruction frame to generate a game video stream, the game video stream including at least one game video frame; and a third generation module 1004, configured to combine the commentary data stream with the game video stream to generate a commentary video stream, the game video frame and the commentary audio corresponding to the same game event in the commentary video stream being aligned in time.

The third generation module 1004 may include:

a first determining unit, configured to determine a target game video frame in the game video stream; where the target game video frame is any one game video frame in the game video stream; and determine a game time corresponding to the target game video frame as a target game time, where the target game time is the time elapsing from the start of the game to the target game video frame;

a second determining unit, configured to determine the game instruction frame generated within the target game time as a target game instruction frame and determine a target frame number of the target game instruction frame; and a time alignment unit, configured to determine the game event corresponding to the target frame number as a target game event, and use the commentary audio for describing the target game event as target commentary audio; align the target commentary audio with the target game video frame in time; and generate the commentary video stream based on the target commentary audio and the target game video frame that are aligned in time.

The game instruction frame corresponds to a first frame rate; and the second determining unit may be further configured to:

determine the target frame number of the target game instruction frame based on the target game time and the first frame rate.

The first determining unit may be further configured to:

utilize an image recognition model to perform image recognition on the game time in the target game video frame to obtain an image recognition result; and determine the game time corresponding to the target game video frame based on the image recognition result and use the determined game time as the target game time.

A frame rate of the game video stream is a second frame rate; and the first determining unit may be further configured to:

determine a basic game time corresponding to the target game video frame based on the image recognition result;

determine a game time offset based on historical recognition times of the basic game time and the second frame rate, where the historical recognition times of the basic game time refer to the number of times that the basic game time is recognized within a historical recognition period; and determine a sum of the basic game time and the game time offset as the target game time.

The first generating module 1002 may include:

a third determining unit, configured to: obtain a preset game event set, where the game event set includes a plurality of preset game events; control the virtual object to perform the in-game behavior in the game based on the game instruction frame; and determine attribute information of virtual objects in the game after the in-game behavior is performed;

a fourth determining unit, configured to select at least one candidate game event matching the attribute information from the plurality of preset game events;

a screening unit, configured to select the target game event from at least one candidate game event; and a first generation unit, configured to generate a commentary text based on the target game event and perform text-to-speech processing on the commentary text to generate the commentary data stream.

The fourth determining unit may be further configured to:

match the attribute information with preset attribute information of the preset game events in the game event set, to obtain target preset attribute information matching the attribute information; and determine the candidate game event based on the preset game event corresponding to the target preset attribute information.

The fourth determining unit may be further configured to:

determine the preset game event corresponding to the target preset attribute information, and use the preset game event that meets a preset commentary condition in the preset game event corresponding to the target preset attribute information as the candidate game event, where the preset commentary condition includes at least one of a game angle condition or an event repeat condition, the game angle condition means that the preset game event is within a game viewing angle, and the event repeat condition means that the number of times that the preset game event occurs within a preset duration is less than a threshold of times.

The screening unit may be further configured to:

obtain event weights corresponding to the candidate game events;

determine event scores corresponding to the candidate game events based on importance of the candidate game events in the game, where the importance is related to at least one of the following: a location where the candidate game event occurs, a virtual object type that triggers the candidate game event, and the number of virtual objects that trigger the candidate game event;

weight the event scores by the event weights to obtain event weighted scores corresponding to the candidate game events; and determine the candidate game event with the highest event weighted score as the target game event.

The second generating module 1003 may include:

a second generation unit, configured to: render the game screen based on the game instruction frame to obtain a global game screen; and determine a target game viewing angle in game viewing angles;

a third generation unit, configured to extract target a game screen from the global game screen based on the target game viewing angle, and generate a game video stream corresponding to the target game viewing angle based on the target game screen, where different game viewing angles correspond to different game video streams.

The third generation module 1004 may include:

a fourth generation unit, configured to combine game video streams with the commentary data stream to generate the commentary video streams corresponding to the different game viewing angles.

In summary, in some embodiments, through online analysis on the game instruction frame, the commentary audio is generated, the game video is rendered, and the commentary audio and the game video are aligned in time to generate the commentary video. By analyzing the game instruction frame to generate the commentary video, on one hand, the commentary video matching the game is generated during the game. There is no need to wait for the game to be over to generate the commentary video, thereby improving the generation timeliness of the commentary video. On the other hand, instead of manually writing the commentary text to generate the commentary video, the commentary video can be generated automatically, thereby further improving the generation efficiency of the commentary video.

The commentary video generation apparatus provided in the foregoing embodiment is illustrated with an example of division of the foregoing functional modules. In actual application, the functions may be allocated to and completed by different functional modules as needed, that is, the internal structure of the device is divided into different functional modules, to implement all or some of the functions described above. In addition, the commentary video generation apparatus provided in the foregoing embodiment and the commentary video generation method embodiments belong to the same conception. For the specific implementation process, reference is made to the method embodiments, and details are not described herein again.

Figure 11:
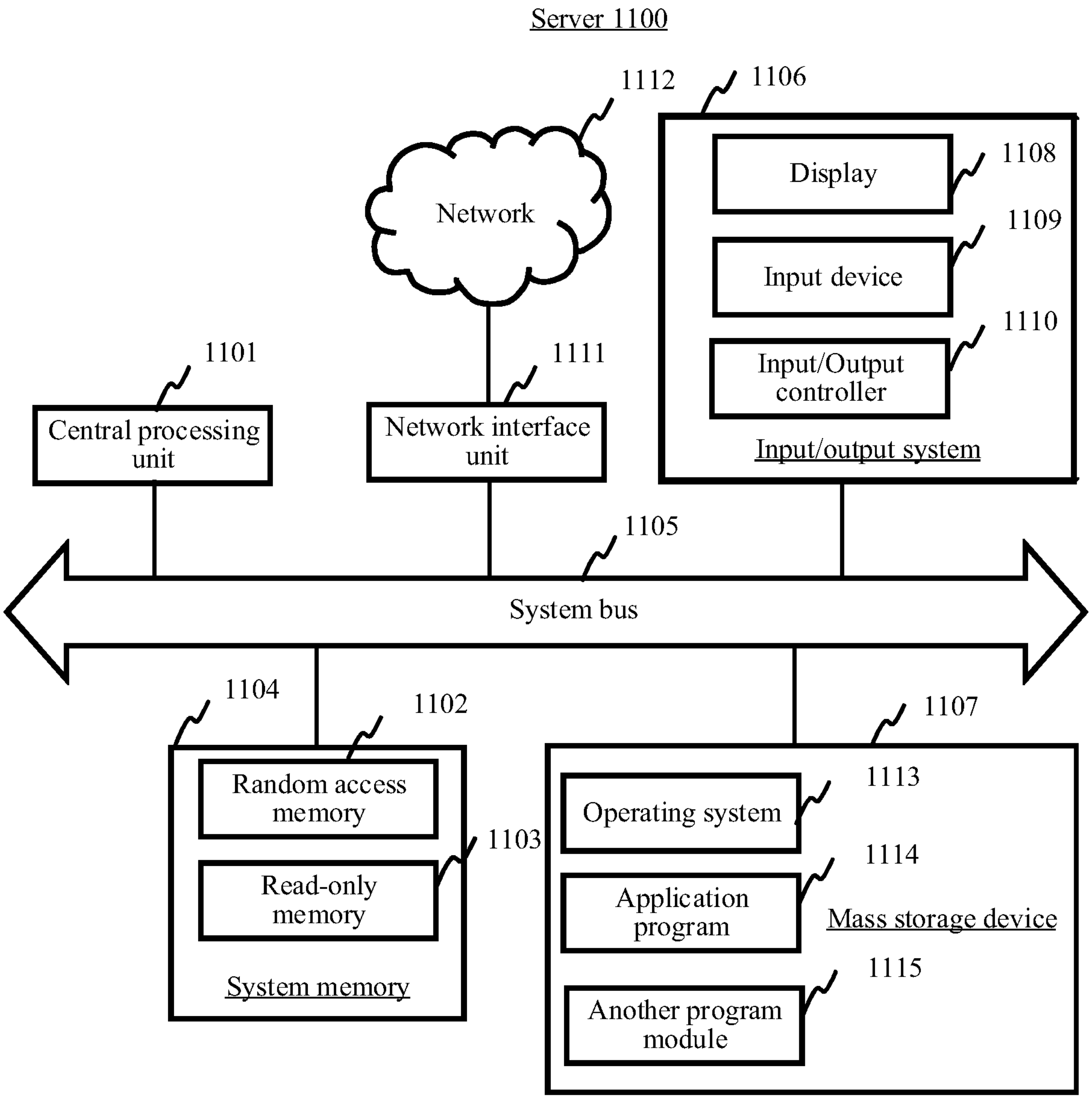
FIG. 11 is a structural block diagram of a server according to some embodiments.

FIG. 11 is a structural block diagram of a server according to some embodiments. The server can be configured to implement a commentary video generation method performed by the server in the foregoing embodiments.

Specifically, the server 1100 includes a central processing unit (CPU) 1101, a system memory 1104 that includes a random access memory (RAM) 1102 and a read-only memory (ROM) 1103, and a system bus 1105 that connects the system memory 1104 and the central processing unit 1101. The server 1100 further includes a basic input/output system (I/O System) 1106 that helps information transmission by the components in the server, and a mass storage device 1107 configured to store an operating system 1113, an application program 1114, and another program module 1115.

The basic input/output system 1106 includes a display 1108 configured to display information and an input device 1109 such as a mouse and a keyboard for the user to input information. The display 1108 and the input device 1109 are both connected to the central processing unit 1101 through an input/output controller 1110 connected to the system bus 1105. The basic input/output system 1106 may further include the input/output controller 1110 for receiving and processing input from a plurality of other devices such as a keyboard, a mouse, and an electronic stylus. Similarly, the input/output controller 1110 further provides output to a display screen, a printer, or other types of output devices.

The mass storage device 1107 is connected to the central processing unit 1101 through a mass storage controller (not shown) connected to the system bus 1105. The mass storage device 1107 and an associated computer-readable storage medium provide non-volatile storage for the server 1100. That is, the mass storage device 1107 may include a computer-readable medium (not shown) such as a hard disk or compact disc read-only memory (CD-ROM) drive.

Without loss of generality, the computer-readable storage medium may include a computer storage medium and a communication medium. The computer storage medium includes volatile and non-volatile, removable and non-removable media that are configured to store information such as computer-readable storage instructions, data structures, program modules, or other data, and that are implemented by using any method or technology. The computer storage medium includes a RAM, a ROM, an erasable programmable ROM (EPROM), an electrically-erasable programmable ROM (EEPROM), a flash memory or another solid-state memory technology, CD-ROM, a digital versatile disc (DVD) or another optical memory, tape cartridge, magnetic cassette, magnetic disk memory, or other magnetic storage devices. Certainly, those skilled in the art may learn that the computer storage medium is not limited to the above. The foregoing system memory 1104 and mass storage device 1107 may be collectively referred to as a memory.

The memory stores one or more programs, and the one or more programs are configured to be executed by one or more CPUs 1101. The one or more programs include instructions used for implementing the foregoing method embodiments, and the CPU 1101 executes the one or more programs to implement the commentary video generation method provided in the foregoing method embodiments.

According to some embodiments, the server 1100 may further be connected, by using a network such as the Internet, to a remote computer on the network and run. That is, the server 1100 may be connected to a network 1112 by using a network interface unit 1111 connected to the system bus 1105, or may be connected to another type of network or a remote server system (not shown) by using the network interface unit 1111.

The memory further includes one or more programs that are stored in the memory. The one or more programs include a operation executed by the commentary server in the method provided by some embodiments.

Some embodiments also provides a computer-readable storage medium, the storage medium storing at least one instruction, at least one program, a code set, or an instruction set, the at least one instruction, the at least one program, the code set, or the instruction set being loaded and executed by a processor to implement the commentary video generation method described above.

According to some embodiments, a computer program product or a computer program is provided, the computer program product or the computer program including computer instructions, the computer instructions being stored in a computer-readable storage medium. a processor of a computer device reads the computer instructions from the computer-readable storage media, and executes the computer instructions, so that the computer device executes the commentary video generation method provided by the foregoing possible implementations.

Other embodiments will be apparent to a person skilled in the art from consideration of the specification and practice of the disclosure here. This disclosure is intended to cover any variation, use, or adaptive change of the disclosure. These variations, uses, or adaptive changes follow the general principles of the disclosure and include common general knowledge or common technical means in the art that are not disclosed herein. The specification and the embodiments are considered as merely exemplary, and the scope and spirit of the disclosure are pointed out in the following claims.

It is to be understood that this disclosure is not limited to the precise structures described above and shown in the accompanying drawings, and various modifications and changes can be made without departing from the scope of the disclosure. The scope of the disclosure is subject only to the appended claims.

What is claimed is:

1. A commentary video generation method performed by a commentary server, the commentary video generation method comprising:

obtaining a game instruction frame, the game instruction frame comprising at least one game operation instruction, and the game operation instruction being used for controlling a virtual object to perform an in-game behavior in a game;

generating a commentary data stream based on the game instruction frame, the commentary data stream comprising at least one piece of commentary audio describing a game event, and the game event being triggered during the virtual object performing the in-game behavior;

rendering a game screen based on the game instruction frame and a global game screen to generate a game video stream, the game video stream corresponding to a target game viewing angle of the global game scene based on a target game screen; and generating a commentary video stream corresponding to the target game viewing angle based on combining the commentary data stream and the game video stream, the game video frame and the commentary audio corresponding to the same game event in the commentary video stream being aligned in time.

2. The commentary video generation method according to claim 1, wherein the combining comprises:

determining a target game video frame in the game video stream, wherein the target game video frame is any one game video frame in the game video stream;

determining a game time corresponding to the target game video frame as a target game time, wherein the target game time is the time elapsing from the start of the game to the target game video frame;

determining the game instruction frame generated within the target game time as a target game instruction frame and determining a target frame number of the target game instruction frame;

determining the game event corresponding to the target frame number as a target game event and using the commentary audio for describing the target game event as target commentary audio;

aligning the target commentary audio with the target game video frame in time; and generating the commentary video stream based on the target commentary audio and the target game video frame that are aligned in time.

3. The commentary video generation method according to claim 2, wherein the game instruction frame corresponds to a first frame rate; and the determining a target frame number of the target game instruction frame comprises:

determining the target frame number of the target game instruction frame based on the target game time and the first frame rate.

4. The commentary video generation method according to claim 2, wherein the determining a game time comprises:

utilizing an image recognition model to perform image recognition on the game time in the target game video frame to obtain an image recognition result; and determining the game time corresponding to the target game video frame based on the image recognition result and using the determined game time as the target game time.

5. The commentary video generation method according to claim 4, wherein a frame rate of the game video stream is a second frame rate; and the determining the game time corresponding to the target game video frame comprises:

determining a basic game time corresponding to the target game video frame based on the image recognition result;

determining a game time offset based on historical recognition times of the basic game time and the second frame rate, wherein the historical recognition times of the basic game time refer to the number of times that the basic game time is recognized within a historical recognition period; and determining a sum of the basic game time and the game time offset as the target game time.

6. The commentary video generation method according to claim 1, wherein the generating a commentary data stream comprises:

obtaining a preset game event set, wherein the game event set comprises a plurality of preset game events;

controlling the virtual object to perform the in-game behavior in the game based on the game instruction frame;

determining attribute information of virtual objects in the game after the in-game behavior is performed;

selecting at least one candidate game event matching the attribute information from the plurality of preset game events;

selecting the target game event from the at least one candidate game event; and generating a commentary text based on the target game event and performing text-to-speech processing on the commentary text to generate the commentary data stream.

7. The commentary video generation method according to claim 6, wherein the selecting at least one candidate game event comprises:

matching the attribute information with preset attribute information of the preset game events in the game event set, to obtain target preset attribute information matching the attribute information; and determining the candidate game event based on the preset game event corresponding to the target preset attribute information.

8. The commentary video generation method according to claim 7, wherein the determining the candidate game event comprises:

determining the preset game event corresponding to the target preset attribute information, and using the preset game event that meets a preset commentary condition in the preset game event corresponding to the target preset attribute information as the candidate game event, wherein the preset commentary condition comprises at least one of a game angle condition or an event repeat condition, the game angle condition means that the preset game event is within a game viewing angle, and the event repeat condition means that the number of times that the preset game event occurs within a preset duration is less than a threshold of times.

9. The commentary video generation method according to claim 6, wherein the selecting the target game event comprises:

obtaining event weights corresponding to the candidate game events;

determining event scores corresponding to the candidate game events based on importance of the candidate game events in the game, wherein the importance is related to at least one of the following: a location where the candidate game event occurs, a virtual object type that triggers the candidate game event, and the number of virtual objects that trigger the candidate game event;

weighting the event scores by the event weights to obtain an event weighted scores corresponding to the candidate game events; and determining the candidate game event with the highest event weighted score as the target game event.

10. The commentary video generation method according to claim 1, wherein the rendering a game screen comprises:

rendering the game screen based on the game instruction frame to obtain the global game screen;

determining the target game viewing angle in game viewing angles; and extracting the target game screen from the global game screen based on the target game viewing angle, and generating the game video stream corresponding to the target game viewing angle based on the target game screen, wherein a plurality of game viewing angles correspond to a plurality of game video streams; and the combining the commentary data stream with the game video stream to generate the commentary video stream comprises:

combining the plurality of game video streams with the commentary data stream to generate a plurality of commentary video streams corresponding to the plurality of game viewing angles.

11. A commentary video generation apparatus, comprising:

at least one memory configured to store program code; and at least one processor configured to read the program code and operate as instructed by the program code, the program code comprising:

obtaining code configured to cause the at least one processor to obtain a game instruction frame, the game instruction frame comprising at least one game operation instruction, and the game operation instruction being used for controlling a virtual object to perform an in-game behavior in a game;

first generation code configured to cause the at least one processor to generate a commentary data stream based on the game instruction frame, the commentary data stream comprising at least one piece of commentary audio describing a game event, and the game event being triggered during the virtual object performing the in-game behavior;

second generation code configured to cause the at least one processor to render a game screen based on the game instruction frame and a global game screen to generate a game video stream, the game video stream corresponding to a target game viewing angle of the global game scene based on a target game screen; and third generation code configured to cause the at least one processor to generate a commentary video stream corresponding to the target game viewing angle based on combining the commentary data stream and the game video stream, the game video frame and the commentary audio corresponding to the same game event in the commentary video stream being aligned in time.

12. The commentary video generation apparatus according to claim 11, wherein the third generation code further comprises:

first determining code configured to cause the at least one processor to:

determine a target game video frame in the game video stream, wherein the target game video frame is any one game video frame in the game video stream; and determine a game time corresponding to the target game video frame as a target game time, wherein the target game time is the time elapsing from the start of the game to the target game video frame;

second determining code configured to cause the at least one processor to determine the game instruction frame generated within the target game time as a target game instruction frame and determine a target frame number of the target game instruction frame; and time alignment code configured to cause the at least one processor to:

determine the game event corresponding to the target frame number as a target game event, and use the commentary audio for describing the target game event as target commentary audio; align the target commentary audio with the target game video frame in time; and generate the commentary video stream based on the target commentary audio and the target game video frame that are aligned in time.

13. The commentary video generation apparatus according to claim 12, wherein the game instruction frame corresponds to a first frame rate, and the second determining code is further configured to cause the at least one processor to determine the target frame number of the target game instruction frame based on the target game time and the first frame rate.

14. The commentary video generation apparatus according to claim 12, wherein the first determining code is further configured to cause the at least one processor to:

utilize an image recognition model to perform image recognition on the game time in the target game video frame to obtain an image recognition result; and determine the game time corresponding to the target game video frame based on the image recognition result and use the determined game time as the target game time.

15. The commentary video generation apparatus according to claim 14, wherein a frame rate of the game video stream is a second frame rate; and the first determining code is further configured to cause the at least one processor to:

determine a basic game time corresponding to the target game video frame based on the image recognition result;

determine a game time offset based on historical recognition times of the basic game time and the second frame rate; and determine a sum of the basic game time and the game time offset as the target game time, wherein the historical recognition times of the basic game time refer to the number of times that the basic game time is recognized within a historical recognition period.

16. The commentary video generation apparatus according to claim 11, wherein the first generation code further comprises:

third determining code configured to cause the at least one processor to:

obtain a preset game event set, wherein the game event set comprises a plurality of preset game events;

control the virtual object to perform the in-game behavior in the game based on the game instruction frame; and determine attribute information of virtual objects in the game after the in-game behavior is performed;

fourth determining code configured to cause the at least one processor to select at least one candidate game event matching the attribute information from the plurality of preset game events;

screening code configured to cause the at least one processor to select the target game event from the at least one candidate game event; and first generation code configured to cause the at least one processor to generate a commentary text based on the target game event and perform text-to-speech processing on the commentary text to generate the commentary data stream.

17. The commentary video generation apparatus according to claim 16, wherein the fourth determining code is further configured to cause the at least one processor to match the attribute information with preset attribute information of the preset game events in the game event set to obtain target preset attribute information matching the attribute information; and determine the candidate game event based on the preset game event corresponding to the target preset attribute information.

18. The commentary video generation apparatus according to claim 17, wherein the fourth determining code is further configured to cause the at least one processor to determine the preset game event corresponding to the target preset attribute information, and use the preset game event that meets a preset commentary condition in the preset game event corresponding to the target preset attribute information as the candidate game event, wherein the preset commentary condition comprises at least one of a game angle condition or an event repeat condition, the game angle condition means that the preset game event is within a game viewing angle, and the event repeat condition means that the number of times that the preset game event occurs within a preset duration is less than a threshold of times.

19. A non-transitory computer-readable storage medium, storing computer code that when executed by at least one processor causes the at least one processor to:

obtain a game instruction frame, the game instruction frame comprising at least one game operation instruction, and the game operation instruction being used for controlling a virtual object to perform an in-game behavior in a game;

generate a commentary data stream based on the game instruction frame, the commentary data stream comprising at least one piece of commentary audio describing a game event, and the game event being triggered during the virtual object performing the in-game behavior;

render a game screen based on the game instruction frame and a global game screen to generate a game video stream, the game video stream corresponding to a target game viewing angle of the global game scene based on a target game screen; and generate a commentary video stream corresponding to the target game viewing angle based on combining the commentary data stream and the game video stream, the game video frame and the commentary audio corresponding to the same game event in the commentary video stream being aligned in time.

20. The non-transitory computer-readable storage medium according to claim 19, wherein the combine the commentary data stream with the game video stream comprises:

determining a target game video frame in the game video stream, wherein the target game video frame is any one game video frame in the game video stream;

determining a game time corresponding to the target game video frame as a target game time, wherein the target game time is the time elapsing from the start of the game to the target game video frame;

determining the game instruction frame generated within the target game time as a target game instruction frame and determining a target frame number of the target game instruction frame;

determining the game event corresponding to the target frame number as a target game event and using the commentary audio for describing the target game event as target commentary audio;

aligning the target commentary audio with the target game video frame in time; and generating the commentary video stream based on the target commentary audio and the target game video frame that are aligned in time.

* * * * *